(12) United States Patent
Hassan et al.

(10) Patent No.: US 12,551,222 B2
(45) Date of Patent: Feb. 17, 2026

(54) OPERATOR-INDEPENDENT HISTOTRIPSY DEVICE

(71) Applicant: QUANTANOSIS.AI, INC., Harlingen, TX (US)

(72) Inventors: Ameer E. Hassan, Harlingen, TX (US); Yousef Hasan Ahmad Khalili, Dubai (AE)

(73) Assignee: QUANTANOSIS AI, INC., Harlingen, TX (US)

( * ) Notice: Subject to any disclaimer, the term of this patent is extended or adjusted under 35 U.S.C. 154(b) by 498 days.

(21) Appl. No.: 17/923,274

(22) PCT Filed: Aug. 9, 2021

(86) PCT No.: PCT/US2021/045158
§ 371 (c)(1),
(2) Date: Nov. 4, 2022

(87) PCT Pub. No.: WO2022/035731
PCT Pub. Date: Feb. 17, 2022

(65) Prior Publication Data
US 2023/0225748 A1    Jul. 20, 2023

Related U.S. Application Data

(60) Provisional application No. 63/064,008, filed on Aug. 11, 2020.

(51) Int. Cl.
*A61B 17/22* (2006.01)
*A61B 17/00* (2006.01)
*A61B 90/50* (2016.01)

(52) U.S. Cl.
CPC .......... *A61B 17/22004* (2013.01); *A61B 2017/0019* (2013.01); *A61B 2017/22028* (2013.01); *A61B 2090/502* (2016.02)

(58) Field of Classification Search
CPC ...... A61B 17/22004; A61B 2017/0019; A61B 2090/502
See application file for complete search history.

(56) References Cited

U.S. PATENT DOCUMENTS

| | | | |
|---|---|---|---|
| 2012/0083717 A1* | 4/2012 | Alleman | A61B 8/546 601/2 |
| 2012/0083718 A1 | 4/2012 | Alleman et al. | |

(Continued)

FOREIGN PATENT DOCUMENTS

| | | |
|---|---|---|
| JP | 2014-515633 A | 7/2014 |
| JP | 2017-538545 A | 12/2017 |
| WO | 2012125304 A1 | 9/2012 |

OTHER PUBLICATIONS

Rubiera et al.; Sonothrombolysis in the Management of Acute Ischemic Stroke; published on Aug. 17, 2012; American Journal of Cardiovasc Drugs vol. 10, p. 5-10 (2010). (Year: 2012).*

(Continued)

*Primary Examiner* — Chao Sheng
(74) *Attorney, Agent, or Firm* — Barnes & Thornburg LLP

(57) ABSTRACT

A histotripsy device may include a headset configured to be mounted to an about a cranium of a human or animal, at least one transducer mounted to the headset and positioned such that, with the headset mounted to and about the cranium, the at least one transducer is positioned over and in contact with at least one temporal or suboccipital region of the cranium, wherein the at least one transducer is configured to emit focused radiation in at an ultrasonic frequency or frequency range, at least one processor, and at least one memory having instructions stored therein executable by the at least one processor to cause the at least one processor to activate the (Continued)

at least one transducer to produce at least one pulse of ultrasonic radiation having a pulse duration of 1 milliseconds or longer.

20 Claims, 2 Drawing Sheets

(56) References Cited

U.S. PATENT DOCUMENTS

| | | |
|---|---|---|
| 2015/0258352 A1 | 9/2015 | Lin et al. |
| 2016/0279449 A1 | 9/2016 | Powers et al. |
| 2018/0001114 A1 | 1/2018 | Li |
| 2018/0146284 A1 | 5/2018 | Benattar et al. |
| 2018/0177491 A1 | 6/2018 | Hynynen et al. |

OTHER PUBLICATIONS

PCT International Search Report and Written Opinion completed by the ISA/US on Oct. 22, 2021 and issued in connection with PCT/US2021/045158.

Extended EP Search Report, completed Jul. 26, 2024 and issued in connection with EP Appln. No. 21856494.6.

Schafer, Mark, et al., "Design, Development, and Operation of a Low-Intensity Focused Ultrasound Pulsation (LIFUP) System for Clinical Use", IEEE Transactions on Ultrasonics, Ferroelectrics, and Frequency Control, IEEE, USA, vol. 68, No. 1, Jul. 2, 2020 (Jul. 2, 2020), pp. 54-64.

Schafer, Mark, et al., "Development of an operator independent ultrasound therapeutic device for stroke treatment", Ultrasonics Symposium (IUS), 2012 IEEE International, IEEE, Oct. 7, 2012 (Oct. 7, 2012), pp. 1948-1951.

Japanese Office Action for corresponding application No. JP2023-507307, dated Feb. 26, 2025.

\* cited by examiner

OPERATOR-INDEPENDENT HISTOTRIPSY DEVICE

CROSS-REFERENCE TO RELATED APPLICATION

This application is a U.S. national stage application of international application serial No. PCT/US2021/045158, filed Aug. 9, 2021, which claims the benefit of, and priority to, U.S. Provisional Patent Application No. 63/064,008, filed Aug. 11, 2020, the disclosures of which are expressly incorporated herein by reference in their entireties.

TECHNICAL FIELD

The present disclosure relates generally to instruments and techniques utilizing ultrasound to fractionate clots resulting from acute ischemic stroke.

BACKGROUND

Acute ischemic stroke (AIS) is the most common type of stroke, and Large Vessel Occlusion (LVO) is one of the most common types of AIS. For LVO, conventional treatments include intravenous thrombolytic medications (ITM) and/or invasive mechanical thrombectomy. Sonothrombolysis is a conventional therapy which uses focused ultrasound to fractionate clots or to increase the effectiveness of intravenous thrombolytic medication. Transcranial sonothrombolysis has been previously implemented in the form of an operator-independent helmet, and was used, along with ITM. Histotripsy is a subset of sonothrombolysis which employs lower frequency (1-MHz) pulses and fractionates soft tissue through controlled cavitation using focused, high-intensity ultrasound pulses.

SUMMARY

The present disclosure may comprise one or more of the features recited in the attached claims, and/or one or more of the following features and combinations thereof. In one aspect, a histotripsy device may comprise a headset configured to be mounted to an about a cranium of a human or animal, at least one transducer mounted to the headset and positioned such that, with the headset mounted to and about the cranium, the at least one transducer is positioned over and in contact with at least one temporal or suboccipital region of the cranium, the at least one transducer configured to emit focused radiation at an ultrasonic frequency or frequency range, at least one processor, and at least one memory having instructions stored therein executable by the at least one processor to cause the at least one processor to activate the at least one transducer to produce at least one pulse of ultrasonic radiation having a pulse duration of 1 milliseconds or longer.

In another aspect, a histotripsy device may comprise a headset configured to be mounted to a cranium of a human or animal, at least one transducer array mounted to the headset and positioned such that, with the headset mounted to the cranium, the at least one transducer array is positioned over and in contact with at least one temporal or suboccipital region of the cranium, the at least one transducer array including multiple transducers or transducer segments each having a focal length of between about 70 to 165 mm and configured to emit focused radiation at an ultrasonic frequency or frequency range, and control circuitry responsive to a control signal input to drive the multiple transducers or transducer segments to produce pulsed ultrasonic radiation.

DESCRIPTION OF THE ILLUSTRATIVE EMBODIMENTS

For the purposes of promoting an understanding of the principles of this disclosure, reference will now be made to a number of illustrative embodiments shown in the attached drawings and specific language will be used to describe the same.

This disclosure relates to a histotripsy device for fractionating clots resulting from acute ischemic stroke (AIS) and/or resulting from other events or conditions. The disclosed histotripsy device is portable and operator-independent, and illustratively includes a headset carrying at least one transducer array configured to emit and direct high-intensity, focused radiation, in the ultrasonic frequency range, into the cranium of a human or animal. The device further illustratively includes a control module operatively coupled to the headset for controlling operation of the one or more transducer arrays.

Figure 1A:
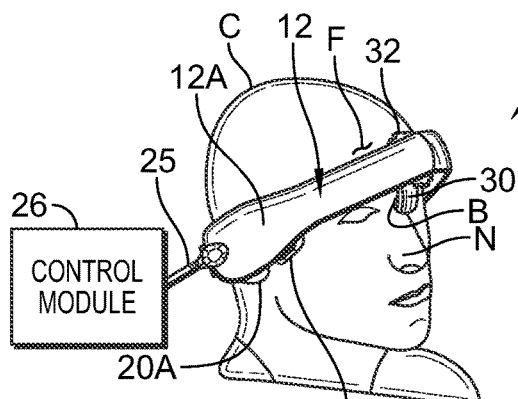
FIG. 1A is a right front perspective view of an embodiment of an operator-independent histotripsy device mounted to and about a cranium of a human.
Figure 1B:
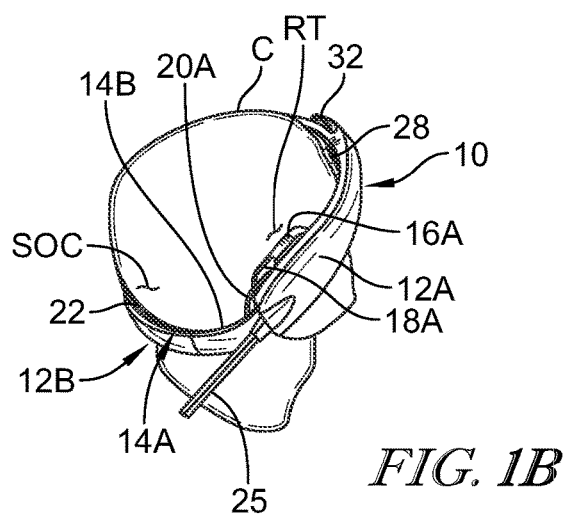
FIG. 1B is a right rear perspective view of the device of FIG. 1A mounted to and about the cranium.
Figure 1C:
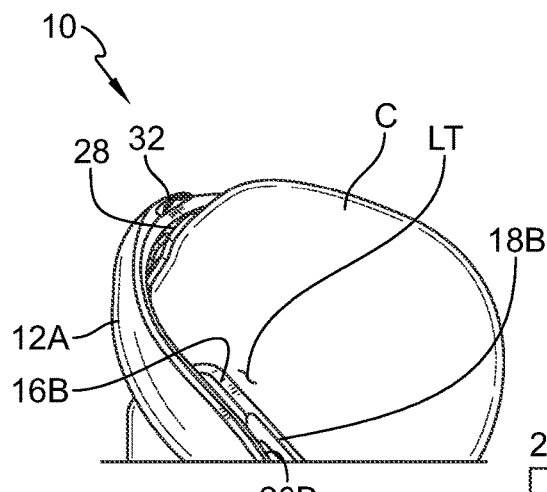
FIG. 1C is a left rear perspective view of the device of FIGS. 1A and 1B mounted to and about the cranium.

Referring now to FIGS. 1A-1C, an embodiment is shown of a histotripsy device 10 for fractionating clots resulting from AIS or other events/conditions. In the illustrated embodiment, the device 10 includes a head-mounted device or headset 12 illustratively provided in the form of a headband sized and configured to be mounted to and about the cranium, C, of a human (as depicted) or animal. In some alternate embodiments the headset 12 may be provided in other forms, examples of which may include, but are not limited to, a helmet, visor, or the like. In some embodiments, the headset 12 may, in any form, be configured to be mounted completely about the cranium, C, as depicted in FIGS. 1A-1C, although in alternate embodiments the headset 12 may be configured to extend only partially about the cranium C.

In the illustrated embodiment, the headset 12 illustratively includes a front band 12A and a rear band 12B configured to be operatively coupled thereto, wherein the combination of the front and rear bands 12A, 12B extend completely about the cranium C as illustrated in FIGS. 1A and 1B. The front band 12A is illustratively formed of a polymer, e.g., in the form of a rigid or semi-flexible plastic material, and is sized and configured to extend about a front portion of the cranium, C, e.g., generally in a C-shape, with opposed ends terminating approximately at or adjacent to each ear 20A, 20B on either side of the cranium C. In the illustrated embodiment, a pair of temporal transducer arrays 16A, 16B are mounted to interior surfaces of the front band 12A and positioned relative to the band 12A so as to be located generally over, and in contact with, the right and left temporal regions, RT and LT respectively, of the head (and brain), i.e., just anterior of each respective ear 20A, 20B. In some embodiments, as illustrated by example in FIGS. 1B and 1C, the transducer arrays 16A, 16B may each include a respective ear registration or locating member 18A, 18B. Illustratively, the ear locating members 18A, 18B are sized and configured to be positioned adjacent to a top (or anterior or posterior) portion of the auricles of the ears 20A, 20B so as to properly position the transducer arrays 16A, 16B over the temporal regions RT, LT of the head of the patient. In some embodiments, the ear locating members 18A, 18B may be sized and configured to be positioned between a portion of the auricles of the ears 20A, 20B, although in other embodiments the ear locating members 18A, 18B may be sized and configured to be positioned adjacent to the auricles. In some embodiments, the transducer arrays 16A, 16B are fixed in position relative to the front band 12A. In alternate embodiments, either or both of the transducer arrays 16A, 16B may be movable mounted to the front band 12A, and in such embodiments one or more conventional position adjustment structures may be incorporated into, or mounted to, the front band 12A to provide for axial and/or transverse adjustment of the position(s) of the transducer array(s) relative to the front band 12A.

The rear band 12B illustratively includes a transducer array carrier 14A and an elastic band 14B operatively coupled to the carrier 14A and to the terminal ends of the front band 12A. Illustratively, the elastic band 14B is sized to be stretchable to allow the headband 12 to accommodate, i.e., be mounted to and about, crania of different sizes. In some embodiments, one or more conventional adjustment members may be coupled to the elastic band 14B to provide for lengthening and/or shortening thereof. In any case, a suboccipital transducer array 22 is illustratively mounted to an inner surface of the transducer array carrier 14A and positioned relative to the rear band 12B so as to be located generally over, and in contact with, the suboccipital region, SOC, of the head of the patient, i.e., inferior to the occipital region of the cranium and above the level of the second cervical vertebra or, in other words, overlying the suboccipital triangle. In some embodiments, the transducer array 22 is fixed in position relative to the transducer array carrier 14A (and relative to the rear band 12B). In alternate embodiments, the transducer array 22 may be movable mounted to the transducer array carrier 14A, and therefore relative to the rear band 12B, and in such embodiments one or more conventional position adjustment structures may be incorporated into, or mounted to, the transducer array carrier 22 to provide for axial and/or transverse adjustment of the position of the transducer array relative to the transducer array carrier 22 and/or relative to the rear band 12B.

In one embodiment, each transducer array 16A, 16B, 22 illustratively includes an eight segment, spherically focused, 1 MHz transducer, having a 10 cm aperture and 7.5 cm focal length, and having an f-number greater than 0.9, e.g., between 1.5 and 1.75. It will be understood that in alternate embodiments, one or more, or all, of the transducer arrays 16A, 16B, 22 may include more or fewer transducer segments, may be configured to emit radiation at frequencies and/or frequency ranges greater or lesser than 1 MHz, have larger or smaller apertures, have greater or lesser focal lengths and/or have greater or lesser f-numbers. It will be further understood that alternate embodiments of the device 10 may include any number of temporal and/or suboccipital transducer arrays. It will also be understood that in some alternate embodiments, the device 10 may include only one or both of the temporal transducer arrays 16A, 16B, or only the suboccipital transducer array 22. It will be further still understood that in some alternate embodiments, the device 10 may include one or more transducer arrays suitably positioned relative to the headset 12 so as to be positioned over, and in contact with, any region(s) of the cranium (or brain), face and/or neck of the patient.

The headband 12 further illustratively includes an adjustment mechanism for tightening and loosening the headband 12 to and about the cranium C of the patient. In the illustrated embodiment, the adjustment mechanism is provided in the form of a forehead pad 28 operatively coupled to an adjustment wheel 32, with the pad 28 and the wheel 32 both operatively coupled to the headband 12 at a portion thereof positioned adjacent to the forehead F of the patient. The forehead pad 28 is sized and configured to contact a portion of the forehead, F, of the patient, and the adjustment wheel 32 is configured to cause, upon turning of the wheel 32, the forehead pad 28 to advance toward or retract from the surface of the forehead F so as to increase or decrease, respectively, the distance between the forehead pad 28 and the inner surface of the headband 12 to thereby tighten or loosen, respectively, the headband 12 to and about the cranium, C, of the patient. In some embodiments, as illustrated by example in FIG. 1A, the adjustment mechanism may further include a nose bride registration or locating device 30 coupled to the forehead pad 28 and configured to locate the pad 28 over the bridge, B, of the nose, N, of the patient.

In the illustrated embodiment, the histotripsy device 10 further includes a control module 26 operatively coupled to headband 12 via a cable 25. Illustratively, one end of the cable 25 is mechanically attached, i.e., affixed, to the front band 12A of the headband 12 as illustrated by example in FIGS. 1A and 1B, and the cable 25 also carries electrical conductors, e.g., wires, one or more of which is operatively coupled to each of the transducer arrays 16A, 16B, 22. In some embodiments, the cable 25 is fixed to and between the headband 12 and the control module 26, e.g., to a housing of the control module 26. In alternate embodiments, the cable 25 and the headband 12 and/or the cable 25 and the control module 26 may be fitted with one or more suitable connectors for electrically connecting the cable 25 to the headband 12 and/or to the control module 26.

Figure 2:
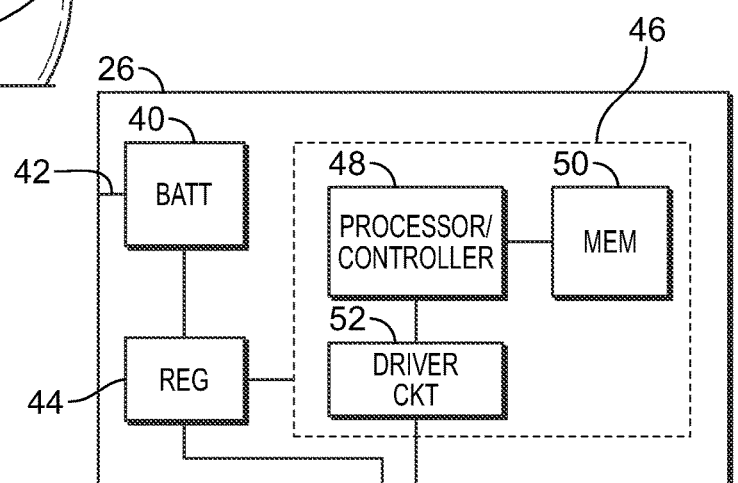
FIG. 2 is a simplified schematic diagram of an embodiment of the control module illustrated in FIG. 1A.

Referring now to FIG. 2, a simplified example is shown of an embodiment of the control module 26. In the illustrated embodiment, the control module 26 includes at least one battery 40 (and/or other source of electrical power). In some embodiments, the battery(s) 40 is/are rechargeable, and in such embodiments the module 26 further includes a charging port 42 electrically coupled to the battery(s) 40 and configured to operatively connect to a conventional charging cable connectable to an external power source. In any case, the module 26 further illustratively includes regulator circuitry 44 electrically coupled to the battery(s) 40. The regulator circuitry 44 is conventional and includes one or more regulator circuits configured to convert the voltage of the battery 44 to one or more voltages suitable to power control circuitry 46 on-board the module 26 and to power the transducer arrays 16A, 16B, 22. In this regard, the regulator circuitry 44 has at least one output electrically coupled to the control circuitry 46 and at least one output coupled (or configured to be coupled) to the headband 12 via the cable 25.

In the illustrated embodiment, the control circuitry 46 includes at least one processor or controller 48 operatively coupled to (or integral with) at least one memory device 50, and operatively coupled to driver circuitry 52. It will be understood that the terms "processor" and "controller" used in this disclosure is comprehensive of any computer, processor, microchip processor, integrated circuit, or any other element(s), whether singly or in multiple parts, capable of carrying programming for performing the functions specified in the claims and this written description. In this regard, the at least one processor or controller 48 may be a single such element which is resident on a printed circuit board with the other elements of the control circuitry 46, or may be or include two or more elements resident with the other elements of the control circuitry 46 and/or resident in one or more locations of the headband 12. The memory 50 is likewise conventional and includes instructions stored therein which are executable by the processor or controller 48 to carry out the various functions of the control module 26 described herein. The driver circuitry 52 is conventional and includes one or more driver circuits configured to drive, i.e., actuate, the transducer arrays 16A, 16B, 22. In this regard, the driver circuitry 52 has at least one output electrically coupled (or configured to be coupled) to the headband 12 via the cable 25.

In some alternate embodiments, headset 12 may carry its own battery and driver circuitry for powering and actuating the transducer arrays 16A, 16B, 22. In some such embodiments, the control module 26 and the headband 12 may each include conventional circuitry configured for wireless communication with one another, and the processor(s) or controller(s) 48 may in such embodiments thereby wirelessly control operation of the transducer arrays 16A, 16B, 22.

As briefly described above in the BACKGROUND section, histotripsy is a subset of sonothrombolysis which employs relatively lower frequency pulses to fractionate soft tissue through controlled cavitation. Generally, there are two different mechanisms of cavitation in histotripsy: (1) shock-scattering, and (2) intrinsic threshold (also known as microtripsy). Shock-scattering employs short-duration, high-amplitude pulses of ultrasound with multiple positive and negative half-cycles that interact to produce cavitation clouds, sometime called "bubble clouds," which mechanically break down clot tissue. Intrinsic threshold histotripsy, on the other hand, employs pulses with a single large tensile phase to produce bubble clouds. These two mechanisms of cavitation thus utilize different pulse durations and different peak negative pulse pressures.

As briefly described above, the memory 50 illustratively includes instructions stored therein which are executable by the processor or controller 48 to carry out the various functions of the control module 26. Illustratively, the instructions stored in the memory 50 include instructions to control the transducers 16A, 16B and 22 to produce 1 MHz fundamental frequency pulses to nucleate bubble activity through either or both of the intrinsic threshold and shock-scattering mechanisms described above. In an embodiment of the former case, i.e., intrinsic threshold, the instructions stored in the memory 50 include instructions executable by the processor(s) or controller(s) 48 to cause the processor(s) or controller(s) 48 to control one or more of the transducers 16A, 16B to produce 1 MHz fundamental frequency pulses of 1 millisecond (ms) in duration (although frequency pulse durations outside of this range are contemplated). In an embodiment of the latter case, i.e., shock-scattering, the instructions stored in the memory 50 include instructions executable by the processor(s) or controller(s) 48 to cause the processor(s) or controller(s) 48 to control one or more of the transducers 16A, 16B to produce 1 MHz fundamental frequency pulses of 5 ms (although frequency pulse durations outside of this range are contemplated). In either case, the histotripsy pulses will be generated by the transducers 16A, 16B, 22 with pulse durations of 1 MHz or longer. The histotripsy pulses will have a single tensile phase in excess of 35 mega-Pascals (MPa) (e.g., in the range of approximately 35 to 40 MPa, although pressures outside of this range are contemplated), and the peak negative pressure of the pulses will be between approximately 20 and 30 MPa (although pressures outside of this range are contemplated). In one embodiment, at each location, i.e., with each transducer 16A, 16B, 22, the transducer 16A, 16B, 22 will be controlled by the processor(s) or controller(s) 48 to generate, and apply to the respective region, between 500 and 1000 pulses at a >40 Hz rate for a total insonation time of between 20 and 60 seconds, although in alternate embodiments more or fewer pulses may be applied and/or may be applied at 40 Hz or less, for any desired total insonation time.

The histotripsy device 10, operated as described above, is capable of fractionating clots without adjunctive intravenous thrombolytic medications (ITM). Advantageously, because the device 10 is capable of therapy independent of ITM, it will allow patients to avoid the risks and side-effects of such medications. In alternate embodiments, however, it is to be understood that the histotripsy device 10 may also be used in conjunction with ITM.

The Histrotripsy device 10 is compact, portable and is operator-independent, and it can therefore be implemented in a wide-variety of clinical settings. For example, it is estimated that approximately 2 million neurons per minute are lost during an acute ischemic stroke (AIS), and AIS treatment is accordingly extremely time-dependent. In this regard, because the Histotripsy device 10 will be fast-acting and easy to use, it can be integrated into an emergency room setting, which could greatly reduce time-to-treatment and thereby potentially improve treatment outcomes. Moreover, because the Histotripsy device 10 is relatively small (e.g., headband or helmet-sized) and operator-independent, it could further be integrated into rural hospitals and mobile stroke units. Use of the Histrotripsy device 10 by first responders (e.g., EMT's) or emergency room clinicians at rural hospitals, for example, can thus provide treatment to AIS victims far sooner than they would otherwise receive using conventional therapies.

Figure 3:
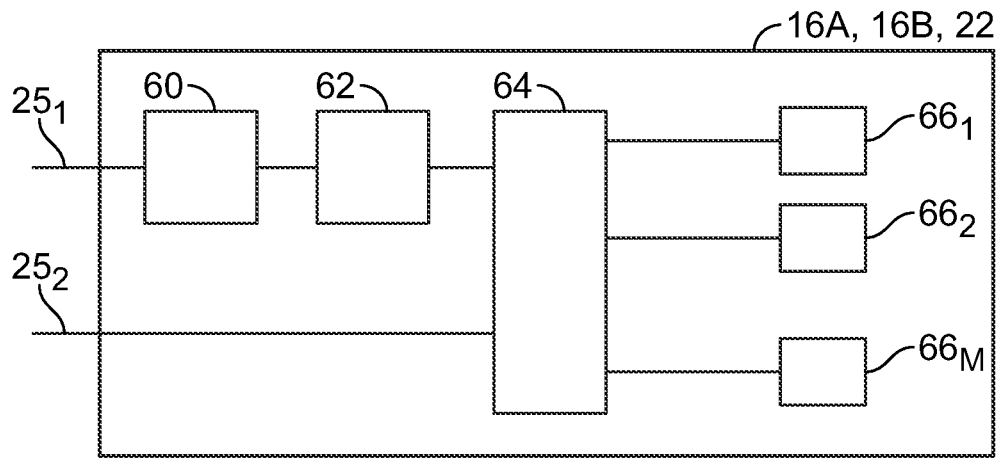
FIG. 3 is a simplified schematic diagram of an embodiment of one of the transducer arrays illustrated in FIGS. 1A-1C.

Referring now to FIG. 3, a schematic diagram is shown of an embodiment of one of the transducer arrays 16A, 16B, 22. In one embodiment, the transducer arrays 16A, 16B, 22 are configured identically as illustrated in FIG. 3, although in alternate embodiments one or more of the transducer arrays 16A, 16B, 22 may be configured differently than the others, e.g., by including more or fewer transducers, by having differently configured transducers, i.e., having different operating characteristics, and/or by including more, fewer or different on-board control circuits. In the embodiment illustrated in FIG. 3, the electrical power signal line 25₁ exiting the control module 26 of FIG. 2 is electrically connected to the input of a high-voltage power supply circuit 60, and the output of the supply 60 is electrically connected to an input of an energy storage circuit 62. In one embodiment, the energy storage circuit is implemented in the form of a capacitor bank, in which case the power supply 60 may illustratively be designed for capacitor charging, although in alternate embodiments one or more other or additional energy storage circuits may be used. The output of the energy storage circuit 62 is electrically connected to a power supply input of a multi-channel output circuit 64 having a number, M, of outputs each electrically connected to the input of a different one of a corresponding number, M, of transducers (or transducer segments) $66_1$-$66_M$, where M may be any positive integer. In one embodiment, as described above, M=8, although in alternate embodiments M may be greater or less than 8. In the illustrated embodiment, the multiple output stages of the multi-channel output circuit 64 include transducer matching networks for matching the electrical input characteristics of the transducers $66_1$-$66_M$. In any case, the control signal line $25_2$ exiting the control module 26 of FIG. 2 is electrically connected to a control signal input of the multi-channel output circuit 64.

In the embodiment illustrated in FIG. 2, the operating frequency of the transducers $66_1$-$66_M$ is generated by the processor/control circuit 48 and the driver circuit 52 of the control module 26, illustratively in the form of a low-voltage, i.e., low-power, square wave control signal, and this low-voltage square wave control signal is then fed to the transducer array 16A, 16B, 22 depicted by example in FIG. 3. In the embodiment illustrated in FIG. 3, the control circuitry 60, 62 and 64 is illustratively configured as a high-voltage switch mode pulse generator which converts the low-voltage square wave control signal supplied by the control module 26 to a high-voltage, i.e., high-power, square wave drive signal for driving the transducers $66_1$-$66_M$. The energy for each output pulse produced by the output circuit 64, and supplied as an input drive signal to a respective one of the transducers $66_1$-$66_M$, is stored in the energy storage circuit 62, which is recharged between pulses by the high-voltage supply circuit 60. Based on the low-voltage square wave control signal supplied by the control module 26 and on the high-voltage energy stored in the energy storage circuit 62, the multi-channel output circuit 64 generates and supplies to each of the transducers $66_1$-$66_M$ a high-voltage, square wave drive signal.

In one example embodiment, the control module 26, depicted by example in FIG. 2, and the control circuitry 60, 62, 64 of the transducer array 16A, 16B, 22, depicted by example in FIG. 3, together produce the high-voltage, square wave drive signals with the following features: signal frequency 1.5 MHz+/−50 KHz, output voltage 0-500 $V_{PK}$, output current 10 A per channel, pulse repetition rate 1-100 Hz, and burst length 1-30 cycles. It will be understood that in alternate embodiments, one or more of the foregoing values may be greater or lesser.

Figure 4:
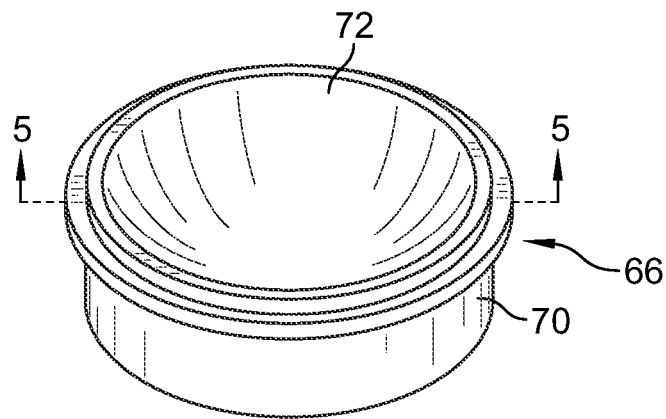
FIG. 4 is a perspective view of an embodiment of one of the transducers illustrated in FIG. 3.
Figure 5:
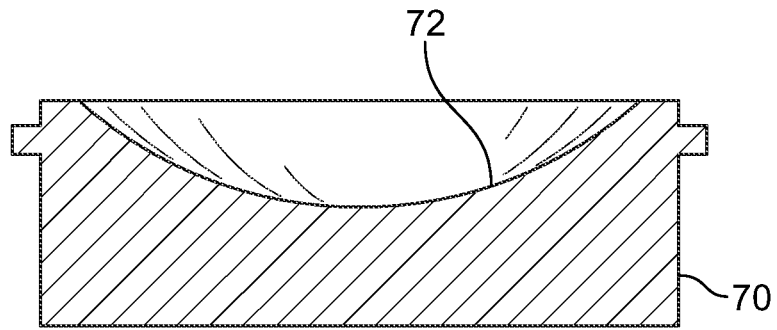
FIG. 5 is a cross-sectional view of the transducer illustrated in FIG. 4 as viewed along section lines 5-5 thereof.

Referring now to FIGS. 4 and 5, an example embodiment is shown of one of the transducers 66, depicted in schematic form in FIG. 3, is shown. The transducer 66 illustratively has a base 70 and a transducer head 72 mounted to the base. The ultrasound-emitting surface of the transducer head 72 is illustratively concave. In the illustrated embodiment, the base 70 is generally cylindrical in lateral cross-sectional shape, as is the transducer head 72, and the concave, ultrasound-emitting surface of the transducer head 72 is accordingly a truncated sphere as best shown in FIG. 5. In alternate embodiments, the base and/or the transducer head 72 may have a non-cylindrical, lateral cross-sectional shape, and/or the ultrasound-emitting surface of the transducer head 72 may be non-concave, e.g., planar, convex or other shape.

In the illustrated embodiment, the transducer 66 is self-focusing and configured to produce ultrasonic pulses with a center frequency of approximately 1.5 MHz, although in alternate embodiments the transducer 66 may not self-focusing and/or may be configured to produce ultrasonic pulses with a center frequency greater or less than 1.5 MHz.

In one example embodiment, the spherical-geometry transducer 66 depicted by example in FIGS. 4 and 5 has the following structural features: 100 mm diameter, focal length=75 mm, and the following ultrasonic pulse signal features: 1.5 MHz+/−50 KHz center frequency, minimum focal tensile pressure=−35 MPa, maximum surface pressure amplitude=300 kPa and linear focal gain=120. It will be understood that in alternate embodiments, one or more of the foregoing values may be greater or lesser. In some embodiments, one or more of the transducers $66_1$-$66_M$ may have the above geometry and features, whereas others of the transducers $66_1$-$66_M$ (and/or one or more of the transducers $66_1$-$66_M$ in one or more other transducer arrays) may have different structural and/or pulse signal features, e.g., focal length=163 mm, minimum focal tensile pressure=−25 MPa, maximum surface pressure amplitude=500 kPa and linear focal gain=49. In some alternate embodiments, one or more of the transducers $66_1$-$66_M$ (and/or one or more of the transducers $66_1$-$66_M$ in one or more other transducer arrays) may a focal length anywhere within the range of between approximately 70 mm and 165 mm.

While this disclosure has been illustrated and described in detail in the foregoing drawings and description, the same is to be considered as illustrative and not restrictive in character, it being understood that only illustrative embodiments thereof have been shown and described and that all changes and modifications that come within the spirit of this disclosure are desired to be protected. For example, in some embodiments, one or more of the transducer arrays 16A, 16B, 22, whether or not movable relative to the headband 12 as described above, can be configured to first determine the precise location(s) of the clot(s), and to then treat the located clot(s) by fractionation as described above. In such embodiments, the memory 50 will include instructions executable by the processor(s) or controller(s) 48 to cause the processor(s) or controller(s) 48 to make such determinations.

What is claimed is:

1. A histotripsy device, comprising:
    a headset configured to be mounted to a cranium of a human or animal,
    at least one transducer mounted to the headset and positioned such that, with the headset mounted to the cranium, the at least one transducer is positioned over and in contact with at least one temporal or suboccipital region of the cranium, the at least one transducer configured to emit focused radiation at an ultrasonic frequency or frequency range,
    at least one processor, and
    at least one memory having instructions stored therein executable by the at least one processor to cause the at least one processor to activate the at least one transducer to produce at least one pulse of ultrasonic radiation having a pulse duration of 1 milliseconds (ms) or longer, and to activate the at least one transducer to produce between 500 and 1000 pulses,
    wherein the at least one transducer is a spherically focused, multi-segment transducer having a 10 cm aperture and a 7.5 cm focal length.

2. The histotripsy device of claim 1, wherein the at least one transducer includes:
    a first transducer operatively mounted to the headset and positioned such that, with the headset mounted to the cranium, the first transducer is positioned over and in contact with a right temporal region of the cranium, and
    a second transducer operatively mounted to the headset and positioned such that, with the headset mounted to the cranium, the second transducer is positioned over and in contact with a left temporal region of the cranium.

3. The histotripsy device of claim 1, wherein the at least one transducer includes a third transducer operatively mounted to the headset and positioned such that, with the headset mounted to the cranium, the third transducer is positioned over and in contact with the suboccipital region of the cranium.

4. The histotripsy device of claim 1, wherein the headset includes a headband configured to be mounted to and about the cranium.

5. The histotripsy device of claim 1, wherein the at least one transducer has an f-number greater than 0.9.

6. The histotripsy device of claim 1, wherein the ultrasonic frequency of the emitted radiation is 1 MHz.

7. The histotripsy device of claim 1, wherein the pulse duration is 5 ms.

8. The histotripsy device of claim 1, wherein the instructions stored in the memory executable by the at least one processor is further configured to cause the at least one processor to activate the at least one transducer to produce the at least one pulse of ultrasonic radiation at a rate greater than 40 Hz.

9. The histotripsy device of claim 1, wherein the instructions stored in the memory executable by the at least one processor is further configured to cause the at least one processor to activate the at least one transducer to produce the at least one pulse of ultrasonic radiation for a total insonation time of between 20 and 60 seconds.

10. The histotripsy device of claim 1, wherein the histotripsy device is configured to fractionate a clot without adjunctive intravenous thrombolytic medications (ITM).

11. A histotripsy device, comprising:
a headset configured to be mounted to a cranium of a human or animal,
at least one transducer mounted to the headset and positioned such that, with the headset mounted to the cranium, the at least one transducer is positioned over and in contact with at least one temporal or suboccipital region of the cranium, the at least one transducer configured to emit focused radiation at an ultrasonic frequency or frequency range,
at least one processor, and
at least one memory having instructions stored therein executable by the at least one processor to cause the at least one processor to activate the at least one transducer to produce at least one pulse of ultrasonic radiation having a pulse duration of 1 milliseconds (ms) or longer, and to activate the at least one transducer to produce between 500 and 1000 pulses
wherein the instructions stored in the memory executable by the at least one processor are further configured to cause the at least one processor to activate the at least one transducer to produce the at least one pulse of ultrasonic radiation for a total insonation time of between 20 and 60 seconds.

12. The histotripsy device of claim 11, wherein the at least one transducer includes:
a first transducer operatively mounted to the headset and positioned such that, with the headset mounted to the cranium, the first transducer is positioned over and in contact with a right temporal region of the cranium, and
a second transducer operatively mounted to the headset and positioned such that, with the headset mounted to the cranium, the second transducer is positioned over and in contact with a left temporal region of the cranium.

13. The histotripsy device of claim 11, wherein the at least one transducer is a spherically focused, multi-segment transducer having a 10 cm aperture and a 7.5 cm focal length.

14. The histotripsy device of claim 11, wherein the at least one transducer has an f-number greater than 0.9.

15. The histotripsy device of claim 11, wherein the ultrasonic frequency of the emitted radiation is 1 MHz.

16. The histotripsy device of claim 11, wherein the pulse duration is 5 ms.

17. The histotripsy device of claim 11, wherein the instructions stored in the memory executable by the at least one processor is further configured to cause the at least one processor to activate the at least one transducer to produce the at least one pulse of ultrasonic radiation at a rate greater than 40 Hz.

18. The histotripsy device of claim 11, wherein the histotripsy device is configured to fractionate a clot without adjunctive intravenous thrombolytic medications (ITM).

19. The histotripsy device of claim 11, wherein the at least one transducer includes a third transducer operatively mounted to the headset and positioned such that, with the headset mounted to the cranium, the third transducer is positioned over and in contact with the suboccipital region of the cranium.

20. The histotripsy device of claim 11, wherein the headset includes a headband configured to be mounted to and about the cranium.

* * * * *